3,175,612
METHOD FOR TREATING WELLS
Don R. Holbert, Robert O. Perry, and John L. Boyd, Tulsa, Okla., assignors, by mesne assignments, to Sinclair Research, Inc., New York, N.Y., a corporation of Delaware
Filed July 13, 1959, Ser. No. 826,818
11 Claims. (Cl. 166—33)

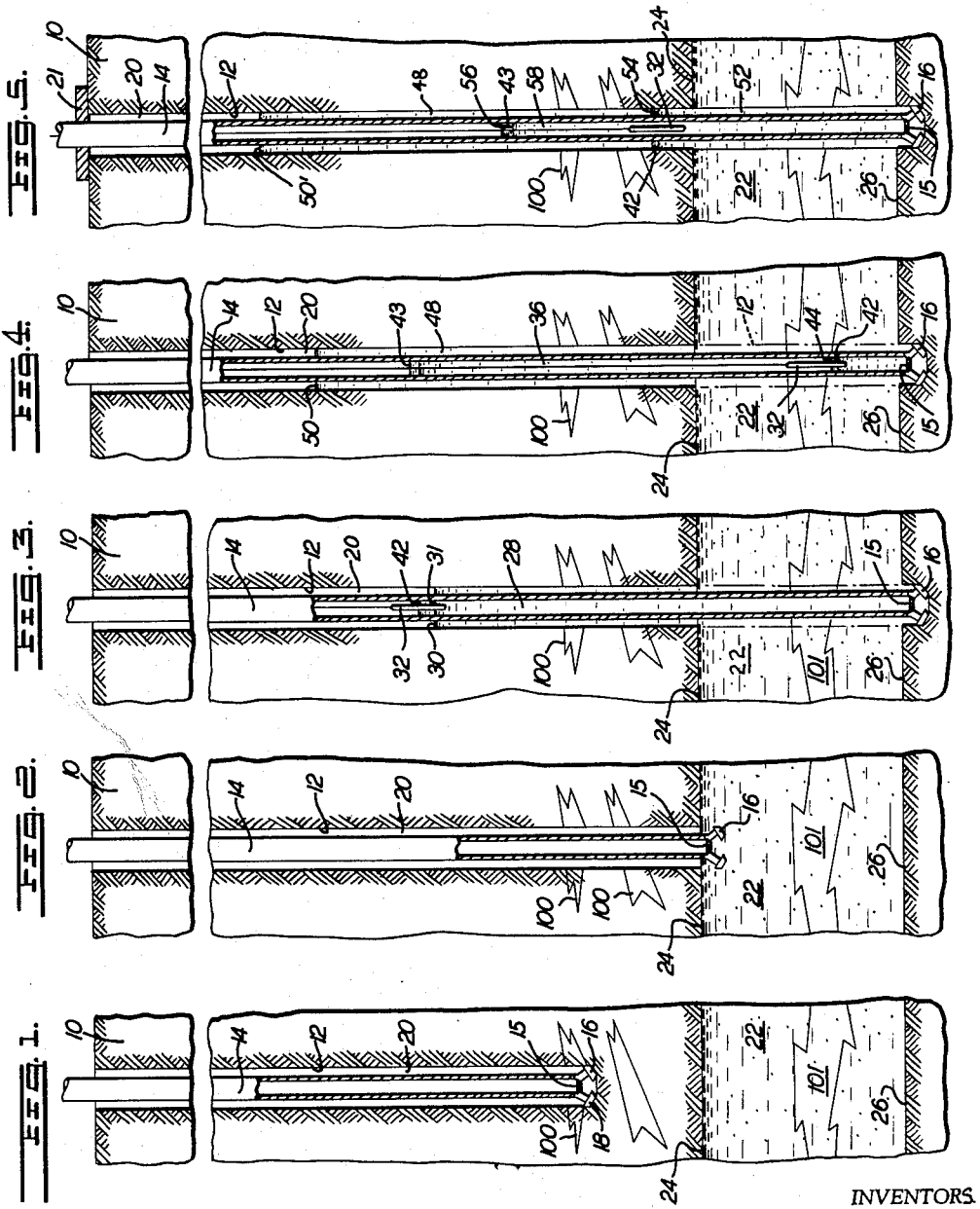

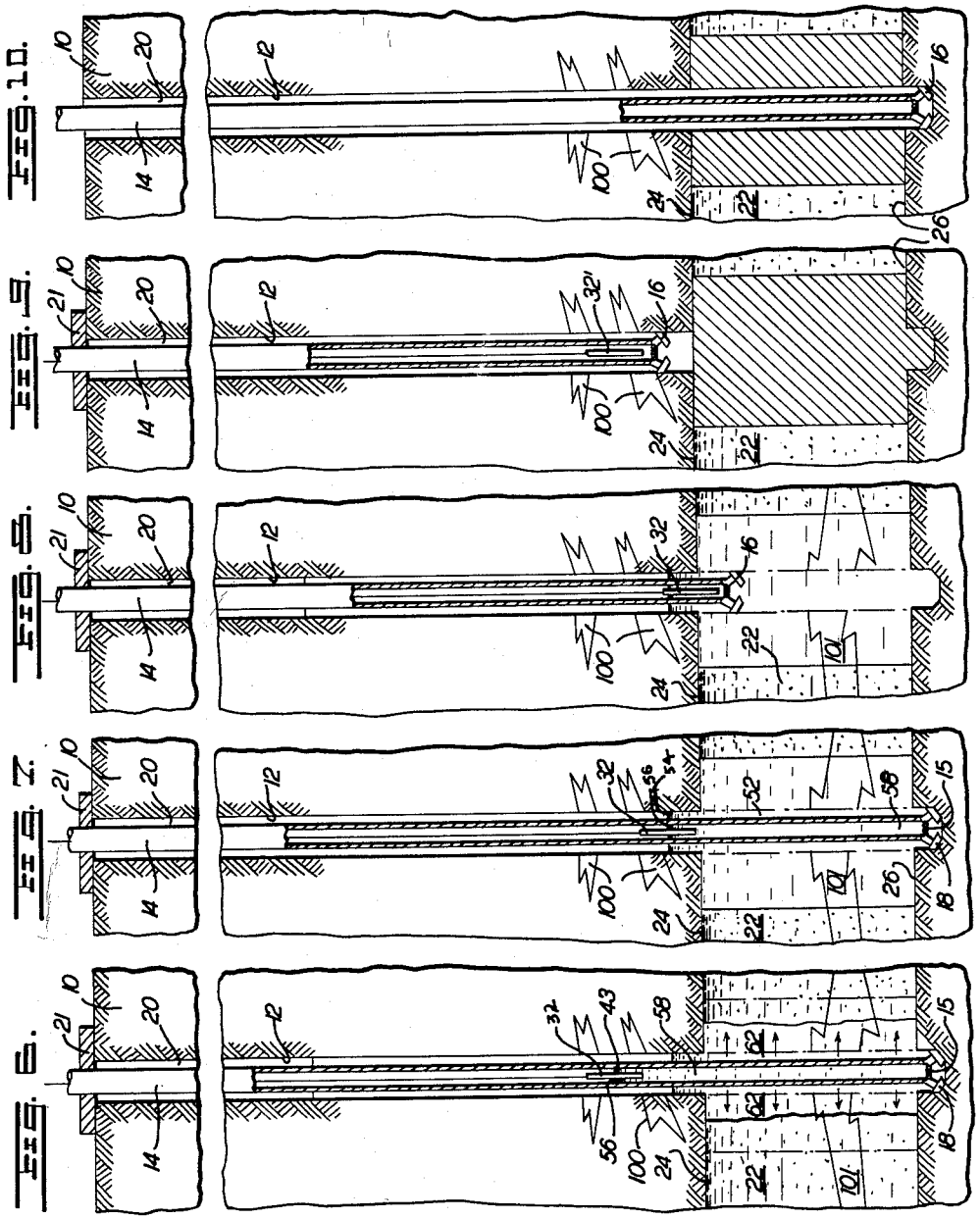

This invention relates to a method for polymerizing liquid, resin-forming materials suitable for use in well bores penetrating permeable subterranean formations. More particularly the present invention is concerned with a method employing tin to copolymerize an alkylidene bisacrylamide and an ethylenic monomer.

These resin-forming materials have particular utility in the well treating field, e.g. processes which combat the obstruction of gas circulation when gas-drilling wells through permeable subsurface formations and other processes which partially or completely plug permeable subterranean well areas. Presently, a Redox catalyst system, i.e. an oxidation-reduction catalytic polymerization system, e.g. an ammonium persulfate-nitrilotrispropionamide system has been added to the liquid resin-forming material near the well site prior to placing the material in the desired location within the well bore. The components of a catalytic system of this type are generally added in amounts to provide initiation of polymerization of the resin-forming material after a predetermined time, e.g. 30 to 90 minutes, has elapsed in order to provide sufficient working time for a proper placement of this material in the well bore. This procedure can render control difficult during the crucial moments of polymerization since sometimes the polymerization of the material is too slow such that any existing turbulence in the well bore will move the material out of position and thus critically curtail its sealing effect. Furthermore, it has been impossible or impractical to shorten the gel time after the solution has been injected into the well. This means that once the solution is prepared and placed in the well, the gel time is fixed and cannot be readily shortened for the sake of expediency.

The present invention is directed to a method providing good control of the copolymerization time or set a time of an alkylidene bisacrylamide and an ethylenic monomer, particularly when this material is copolymerized in a well bore hole penetrating a permeable subterranean formation. The desired result is accomplished by subjecting an aqueous mixture of the alkylidene bisacrylamide and the ethylenic monomer containing catalytic amounts of an oxidizing agent to a novel method of polymerization which involves the use of a tin source material which gives off, for example, tin in an amount sufficient to copolymerize these compounds expeditiously. The tin source material can be an electrode system for electrically discharging tin, for instance, an iron-tin electrode system wherein the tin metal is connected to the positive side and the iron to the negative side of a D.C. current system and there is a gap between the separate iron and tin electrodes. As an example an iron electrode in tubular form can enclose a tin wire electrode.

In accordance with the method of the present invention which is particularly suitable when polymerization is effected in a well bore, an aqueous solution of resin-forming material containing a mixture of an alkylidene bisacrylamide and ethylenic monomer, and catalytic amounts of an oxidizing agent, is exposed to tin to expedite polymerization. The catalytic amount of the oxidizing agent can range generally from about 0.01 to 2.0 weight percent and preferably from about 0.3 to 0.6 weight percent based on the aqueous solution of the resin-forming material while the tin ion dosage will generally be the dosage provided by using a tin-iron electrode with an electric current across the electrode of at least about one amp, for instance, from about one to ten amps, and preferably at least about two amps. Rather than produce the tin ions by direct electrolysis of the resin-forming material, the electrolysis product can be made on the surface by electrolysis in an aqueous medium and added to the resin-forming material located in the well.

In accordance with a modification of the method of the present invention, a small, e.g. catalytic, amount of a Redox catalyst system, i.e. an oxidizing agent and a reducing agent, is added to an aqueous mixture of the alkylidene bisacrylamide and ethylenic monomer, and is added to expedite polymerization.

The above procedures of this invention significantly reduce the set time normally required if only the Redox catalyst system is used. The oxidizing agent, e.g. ammonium persulfate, is an acceptable catalyst to polymerize this aqueous mixture and it can be employed with a reducing agent, e.g. a promoter such as sodium thiosulfate or nitrilotrispropionamide. The amounts of each of the oxidizing agent and reducing agent usually are about 0.01 to 2.0 weight percent but preferably about 0.3 to 0.6 weight percent based on the aqueous solution of the resin-forming material while the tin ion dosage will generally be within the ranges specified above. These amounts can be varied, according to the tin dosage employed, to give the desired working life of the resin-forming material. For instance, when a tin dosage provided by a tin-iron electrode with a current of 6 to 8 amps is contemplated, about 0.3 weight percent of ammonium persulfate and 0.6 weight percent of nitrilotrispropionamide can be incorporated in a resin-forming material such that after placement in position in the well bore, this tin dosage can be added to the resinous material to effect substantially instantaneous polymerization or polymerization at least within 20 minutes and preferably within 5 minutes.

As heretofore indicated, polymerization according to the method of the invention is effected by using tin and an oxidizing catalyst or a Redox catalyst system. The oxidizing catalyst or the component of the Redox catalyst system can include, for instance, any of the usual water-soluble peroxy catalysts, derived from per-acids such as persulfuric, perchloric, perboric and permanganic and their salts. For example, ammonium, potassium and sodium persulfates, hydrogen peroxide, the alkali metal and ammonium perchlorates, and the like may be employed. Among the reducing components that can be employed are the oxygen-containing sulfur compounds such as the alkali metal e.g. sodium or potassium bisulfites, and nitrilotrispropionamide. Examples of typical reducing agent-oxidizing agent combinations are nitrilotrispropionamide-ammonium persulfate, nitrilotrispropionamide-potassium persulfate and nitrilotrispropionamide-sodium persulfate systems. A mixture of the two catalyst components in a Redox system in quantities corresponding to their oxidation-reduction equivalents is not a requirement but may be desirable for some purposes.

The liquid resin-forming materials polymerized according to the method of the present invention are particularly suitable for use in the well bore treating field and include an aqueous solution of an alkylidene bisacrylamide and ethylenic comonomer, the bisacrylamide having the formula:

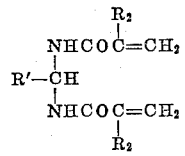

in which

is a hydrocarbon residue of an aldehyde containing, for instance, from about 1 to 10 and preferably from about 1 to 5 carbon atoms, e.g. formalde-, acetalde-, and valeraldehyde; but usually about 1 to 3 carbon atoms; and $R_2$ is a member of the group consisting of hydrogen and a methyl radical.

The other comonomer is a solid, liquid or gaseous ethylenic (i.e., contains at least the $>C=C<$ radical) compound with a solubility of at least about 2 percent by weight, and preferably at least about 5 percent, in water and which copolymerizes with the aforesaid bisacrylamide in an aqueous system. Although not essential in practicing the invention, it is preferred to select an ethylenic comonomer which is preferably soluble or at least self-dispersible in water with appropriate stirring, as such, for example, methylene-bisacrylamide, which is capable of polymerizing.

In addition to the comonomer N,N'-methylenebisacrylamide set out in the examples hereinafter, any of the alkylidene bisacrylamides corresponding to the above formula which are described and claimed in Lundberg Patent No. 2,475,846 hereby incorporated by reference, or mixtures thereof may be used as cross-linking agents. Only slight solubility is required of the alkylidene bisacrylamide in view of the small amount used; therefore, this component may have a water solubility as low as about 0.02 percent by weight at 20° C. but a solubility of at least about 0.10 percent is more desirable for general purposes.

A wide variety of ethylenic comonomers or mixtures thereof are copolymerizable with the alkylidene bisacrylamides; those having a formula containing at least one $>C=C<$ group, preferably containing from about 1 to 8 carbon atoms, hereinafter referred to as the ethenoid group, and having appreciable solubility in water are suitable for use in the present invention. See U.S. Patent No. 2,801,985, hereby incorporated by reference. As set forth in this patent, the unsubstituted bonds in the ethenoid group may be attached to one or more of many different atoms or radicals including hydrogen, halogens, such as chlorine and bromine, cyano, aryl, aralkyl, alkyl, and alkylene with or without solubilizing groups attached to these hydrocarbons. In addition, the substitutents on the ethenoid group may comprise one or more hydrophilic groups including formyl, methylol, polyoxyalkylene residues and quaternary ammonium salt radicals.

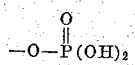

—OOCH; —OOCCH$_3$; —SO$_3$X, where X is H, NH$_4$, an alkali metal or an alkylamine; —CONR$_2$ and

—CH$_2$CONR$_2$ where each R is hydrogen, alkylol, lower alkyl or a polyoxyalkylene radical; and —COOR' and

—CH$_2$COOR' where R' is a H, NH$_4$, alkali metal, alkaline earth metal, organic nitrogenous base, alkylol, lower alkyl or polyoxyalkylene radical. The large number of combinations and proportions of the various suitable substituents makes it impractical to list all compounds in this category which may be employed. The water solubility of these substances is known to depend chiefly on the number and type of hydrophilic and hydrophobic radicals therein; for example, the solubility of compounds containing an alkyl radical diminishes as the length of the alkyl chain increases and aryl groups tend to decrease water solubility whereas the aforesaid hydrophilic substituents all tend to improve the solubility of a given compound in water. Accordingly, the comonomer should be selected according to chemical practice from those containing sufficient hydrophilic radicals to balance any hydrophobic groups present in order to obtain the requisite water solubility of monomer.

Among the water-soluble ethenoid monomers, those containing an acrylyl or methacrylyl group are especially recommended. These are exemplified by N-methylol acrylamide, calcium acrylate, methacrylamide and acrylamide. Other suitable ethenoid compounds are acrylic acid; other N-substituted acrylamides, such as N-methylacrylamide, N-3-hydroxypropylacrylamide, dimethylamino-propylacrylamide, N-ethylol acrylamide; acrylonitrile; saturated alkyl esters of acrylic acid, i.e. methyl acrylate, β-hydroxyethyl acrylate; ethylene glycol and polyethylene glycol acrylates, an example being the reaction product of β-hydroxyethylacrylate or acrylic acid with about 1 to about 50 mols or more of ethylene oxide; salts of acrylic acid, i.e., magnesium acrylate, sodium acrylate, ammonium acrylate, zinc acrylate, β-amino-ethylacrylate, β-methylaminoethylacrylate, guanidine acrylate and other organic nitrogenous base salts, such as diethylamine acrylate and ethanolamine acrylate; quaternary salts like alkyl acrylamidopropyl dimethylamino chloride; acrolein, β-carboxyacrolein, butenoic acid; α-chloroacrylic acid; β-chloroacrylic acid; as well as methacrylic acid and its corresponding derivatives.

Maleic acid and its corresponding derivatives including partial esters, partial salts, and ester salts thereof; maleamic, chloromaleic, fumaric, itaconic, citraconic, vinyl sulfonic, and vinyl phosphonic acids and their corresponding derivatives and mixtures thereof. Derivatives of this kind and other suitable compounds include α,β-dichloroacrylonitrile, methacrolein, potassium methacrylate, magnesium methacrylate, hydroxyethyl methacrylate, zinc β-chloroacrylate, trimethylamine methacrylate, calcium α-chloromethacrylate, diethyl methylene succinate, methylene succindiamide, monomethyl maleate, maleic diamide, methylene maloanamide, diethyl methylene malonate, methyl isopropenyl ketone, ethyl vinyl ketone, propyl vinyl ketone, vinyl formate, vinyl lactate, vinyl bromoacetate, vinyl chloroacetate, vinyl pyrrolidone, allyl levulinate, allyl alcohol, methallyl alcohol, diallyl carbonate, allyl lactate, allyl gluconate, di(β-aminoethyl) maleate, di(methylaminoethyl) maleate, di(N,N'-dimethyl-β-aminoethyl) maleate, sulfonated styrene, vinyl pyridine, maleic anhydride, sodium maleate, ammonium maleate, calcium maleate, monopotassium maleate, monoammonium maleate, monomagnesium maleate, methyl vinyl ether, N-aminoethyl maleamide, N-aminoethyl maleimide, alkyl aminoalkyl maleamides, N-vinyl amines, N-allyl amines, heterocyclic ethenoid compounds containing nitrogen in a tertiary amino group, and the amine and ammonium are salts of said cyclic compounds, N-vinyl acetamide, N-vinyl-N-methyl formamide, N-vinyl-N-methylacetamide, N-vinyl succinimide, N-vinyl diformamide, N-vinyl diacetamide, vinyl sulfonyl chloride, vinyl sulfonic acid salts, vinyl sulfonic acid amides, vinyl oxazolidone, allyl amine, diallylamine, vinyl methyl pyridinium chloride, and allyl trimethyl ammonium chloride to name only a few of the operative compounds.

The preferred resin-forming composition of the present invention is in an aqueous medium and has an initial viscosity approximating that of water. These compositions can be formed by dissolving a mixture of acrylamide and N,N'-methylenebisacrylamide in fresh water. Generally, this mixture contains about 1 to 25 weight percent of N,N'-methylenebisacrylamide and about 99 to 75 weight percent of acrylamide. The aqueous solution will usually include from about 5 weight percent of this mixture to its limit of solubility and preferably this amount is about 5 to 25 percent. Although the acrylamide as such is preferred, its nitrogen atom could be substituted as with a hydroxy methyl or a hydroxy ethyl group.

In addition to the above-mentioned ingredients, the compositions may include other components, particularly when they are destined for use down well holes, e.g. in processes for plugging permeable well areas. For instance, compounds exhibiting catalytic activity or weighting agents may be added. Components exhibiting catalytic activity can be added prior to injection of the compositions in the well bore. Care must be exercised as to the amount of catalytic material added and this will depend upon the specific component employed, however, this amount should be such that sufficient working time is provided to permit displacement of the composition into the permeable area to be plugged before it hardens into the solid or semi-solid state. In general, the working life of the material at the temperatures and pressures encountered in the bore hole is such that it has a viscosity of up to about 10 to 15 centipoises, advantageously about 1 to 5 centipoises, at these conditions for at least about 15 minutes, and preferably for at least about 30 minutes. When referring to "working life" we mean the time which elapses after all essential ingredients for the formation of the solid or semi-solid plugging resin or plastic under the conditions of temperature and pressure found in the area of the well bore to be plugged have been added, for instance monomer, catalyst, promoter, etc. As pointed out above, ammonium persulfate is an acceptable catalyst to polymerize the aqueous mixture and it can be employed with a promoter such as sodium thiosulfate or nitrilotrispropionamide. The amount of each of the catalyst and promoter usually are about 0.1 to 2 weight percent based on the aqueous solution of resin-forming material, and these amounts can be varied to give the desired working life. For instance, a weight ratio of catalyst to promoter of 1 to 2 in an aqueous solution containing 20 weight percent of the acrylamide and N,N'-methylenebisacrylamide (95 percent acrylamide and 5 percent N,N'-methylenebisacrylamide) will give a working life at 70° F. of about 60 to 120 minutes when the catalyst plus promoter is about 0.5 to 1.5 percent of the aqueous solution.

As to using these resin-forming compositions in some well plugging processes, unless the material is light enough to remain upon the surface of the salt water which has a specific gravity greater than 1, generally at least about 1.2, it must be quickly displaced into the permeable area before it can disperse into the salt water phase or an overlying fresh water layer, if any be present. To reduce the chances of this happening, resin-forming materials having specific gravities of up to about 1.18, preferably up to about 1.13, can be used. Also, as it may be advantageous to locate the resin-forming material between the salt water layer and an overlying fresh water column, the resin-forming material can preferably have a specific gravity of at least about 1.07, more desirably at least about 1.11. The specific gravity of the resin-forming material can be adjusted by the addition of weighting agents. Suitable weighting agents include water-soluble, non-ionizing organic compounds, e.g. sugar and glycerol. Calcium chloride, for instance in amounts from about 15 to 30 weight percent can be used when it is desired to place the resin forming material on the bottom of a well bore.

The present invention can be used in a method employed in plugging a permeable well location, for instance, in a method described in copending application Serial No. 642,867, filed February 27, 1957, hereby incorporated by reference. In this method the area to be plugged must first be located as to its vertical position in the well bore. This area is spaced away from the bottom of the bore and generally will be between two adjacent areas of lesser permeability although this is not an absolute necessity. Salt (NaCl) water or brine is then provided in the well bore in an amount sufficient to reach the approximate location of the area to be plugged. The level of the salt water can be at or slightly below or above the plugging area but it should not be vertically displaced a distance from the area such that substantial plugging occurs in locations where it is not desired. The salt water can be added as such to the well, or fresh water can be injected which after remaining a sufficient period in the bore will become salty due to the presence of salt in the earth's strata. After the proper level of salt water is established an organic resin-forming material is positioned on this medium. Preferably, the salt water layer is below a fresh water layer with these materials forming an interface in the approximate location of the permeable area, and in this case the resin-forming material is positioned on the salt water layer and thus in the interface between these layers. The resin-forming material is then displaced into the adjacent well area or stratum as by natural flow or by a separately applied gaseous or liquid pressure and allowed to remain in the area to set up or harden to provide a partial or complete plug resistant to the flow of fluids, particularly liquids. The permeable area to be plugged can be located by conventional procedures, e.g. the use of liquid-to-liquid interfaces between two dissimilar liquids such as water and oil, fresh and salt water, and radioactive and non-radioactive liquids, e.g. see U.S. Patent Nos. 2,376,878 and 2,413,435, and Pfister, R. J. Trans. A.I.M.E., vol. 174, page 269, 1948, to determine the injectivity profile or liquid injection characteristics of the well or sand face.

The detection means employed for tracking the position of the resin-forming material in the well bore in this method can vary. In one method using a secondary buffer, the characteristics of the material can be such that it is detectable by an electrical conductivity profiling unit when the secondary buffer is placed on the resin-forming material. Thus, if the secondary buffer is essentially nonconductive and the resin-forming composition is essentially conductive the conductivity profiling unit will indicate the degrees of current flow within the resin-forming composition and secondary buffer. Accordingly, when the conductivity circuit is essentially poor, the instrument is in the secondary buffer and when the conductivity circuit is essentially good, the instrument is in the resin-forming composition. Thus, by raising and lowering the instrument the interface in between the resin-forming material and the secondary buffer can be located and by checking the depth of the detection instrument the location of the upper layer of the resin-forming material is known.

A device suitable for use in measuring the electrical conductivity of the fluids in the well bore is described in U.S. Patent No. 2,776,563. This device, known as a magnetic coupler, includes a magnetic core, and two electrically conducting coils essentially composed in two basic combinations. One of the combinations, conveniently referred to as a magnetic coupler sub, is essentially comprised of one of the coils, the first coil, surrounding the magnetic core, and fixedly mounted within a structure. The other combination, conveniently referred to as the stinger, comprises a cable containing an insulated electrical conductor communicating with the other coil which is contained within a structure adapted to removably surround the first coil. Under operational conditions the magnetic coupler sub may be installed in a position just above the drill bit in a rotary type drill string. Accordingly, when the position of a liquid of known electrical conductivity within the well bore is desired, the stinger is lowered into the drill pipe string and joined to the magnetic coupler sub, the drill pipe is maneuvered until the liquid or the interface between liquids is located, and by noting the depth of the stinger, the position of the liquid or the interface between two liquids is known. Additionally, if a two-conductor cable is employed in the stinger arrangement, the stinger itself can be used as an integral detection unit.

By following the present invention, after the resin-forming material is displaced into the adjacent well area, a pure tin source e.g. an iron-tin electrode, is lowered into the well bore, the resin-forming material, in this instance an aqueous solution of alkylidene bisacrylamide and an ethylenic monomer containing a Redox catalyst system described above, receives a tin dosage and polymerization is effected. The tin source is removed leaving the polymerized material as a solid and thus sealing the permeable formation.

The present invention can also be used in a method for combatting the effect of a reduction or a cessation of the air circulation in air-drilling methods when drilling through permeable areas from which gas, liquid or loosely consolidated strata enters the well bore being drilled. The desired result is accomplished by selectively and substantially completely sealing formations of this character from the well bore in an expeditious and economical manner so as to maintain the advantages of the air-drilling procedures over the conventional procedures which use mud as the circulating medium.

According to this method, when an obstruction of air circulation, i.e. a reduction or cessation thereof, is experienced during an air-drilling operation and the obstruction is attributed to the ingress of gas, liquid or loosely consolidated earth particles into the bore from an adjacent stratum, resin-forming material is introduced into a string of tubing extending downwardly below the permeable formation. The resinous material, which is generally weighted, e.g. with $CaCl_2$ to be heavier than salt water, is conducted downwardly in the tubing. A first portion of the resinous material is conducted through the lower extremity of the tubing and forms a column in the annular space between the tubing and the wall of the well bore which column at least covers the formation to be sealed. The level of this annular column is maintained while the upper level of the remaining or secondary portion of the resinous material in the tubing is pressured to force permeable formation sealing amounts of resinous material into the permeable formation. The resinous material is maintained in this position until it substantially solidifies. The sold resin is drilled through and drilling is continued with gas circulation to remove cuttings from the well.

This material is of the type that will harden at temperature encountered in the well bore, which in many cases are between about 50 to 200° F. The quantity of resin-forming material used must be adequate to extend horizontally into the formation of ingress for a distance sufficient to securely seal this formation subsequent to the hardening of the resinous material to prevent further ingress of unwanted extraneous materials. This distance usually extends at least about six inches into the formation. Moreover, in this method it is imperative that the resin-forming composition occupy the well bore adjacent the formation of ingress when the hardened resin is formed. Accordingly, after the introduction of the resin-forming composition, which has a specific gravity higher than the ingressing well fluid, into the well bore detection means are employed to track the upper level of the resin-forming composition, and gas or liquid, e.g. air or water pressure is applied to bring this upper level approximately adjacent the upper level of the strata of ingress, and the resinous composition is maintained in this position unit, it solidifies. Although air, other gas or liquid presure can be employed in our method, air is preferable since (a) it permits better control of the resin-forming material, and (b) the well bore is drier following the polymerization of the resin-forming composition and no time must be spent drying the hole before drilling. The gas pressure will depend upon the nature of the obstruction encountered and the depth of the permeable formation; it is generally greater than about 150 p.s.i. but is usually about 150 to 1000 p.s.i. Since tremendous pressures can be required, it may be desirable to produce such pressures by employing liquid and gas in combination, e.g. provide a liquid column above the resin-forming composition and exert air pressure on the liquid column. Following solidification of the resinous composition, air-drilling is resumed in the stinger arrangement the stinger itself can be used as an integral detection unit.

The present invention can be incorporated in this gas drilling method after the catalyzed resin-forming material is in place. At this point, tin source means, e.g. an iron-tin electrode, can be placed on the drill bit and lowered into the well bore hole inside the drill pipe to effect polymerization of the material.

The method of the present invention can also be used in another method for combatting the effect of a reduction or a cessation of the air circulation in air-drilling methods in which the resin-forming material is of a specific gravity lighter than salt water and described in copending application Serial No. 686,198, filed September 25, 1957.

The following specific examples will serve to illustrate this invention but are not to be considered limiting.

*Example I*

(A) A composition as prepared by adding 25 weight percent of calcium chloride (250 grams) and 10 weight percent (100 grams) of resin-forming material (95 percent acrylamide and 5 percent N,N'-methylenebisacrylamide) to a liter of water. The composition, a solution, has a pH of 5.8 and a specific gravity of 1.18. The weight percents unless specified otherwise are on the basis of the water initially containing the resin-forming material and before the addition of the catalyst system.

(B) A Redox catalyst system is prepared by adding 0.5 weight percent of nitrilotrispropionamide (0.5 gram) and 0.25 weight percent of an ammonium persulfate (0.25 gram) in 500 cc. of water. This catalyst system is added to the composition of Example I(A) and the resulting solution is subjected to a temperature of 100° F. The solution polymerized to a gel in 9 minutes.

An essentially similar solution when subjected to a tin ion dosage produced by using a tin-iron electrode and a current of 6–8 amps and 12 volts, polymerized instantly.

*Example II*

A Redox catalyst system is prepared by adding 0.25 weight percent of nitrilotrispropionamide (0.25 gram) and 0.125 weight percent of ammonium persulfate (0.125 gram) in 500 cc. of water. This catalyst system is added to a composition essentially the same as the composition of Example I(A) and the resulting solution is subjected to a temperature of 100° F. The solution polymerized to a gel in 25 minutes.

An essentially similar solution when subjected to a tin ion dosage provided by using a tin-iron electrode and a current of 6–8 amps and 12 volts, polymerized instantly.

*Example III*

A Redox catalyst system is prepared by adding 0.10 weight percent of nitrilotrispropionamide (0.10 gram) and 0.05 weight percent of ammonium persulfate (0.05 gram) in 500 cc. of water. This catalyst system is added to a composition essentially the same as the composition of Example I(A) and the resulting solution is subjected to a temperature of 100° F. The solution polymerized to a gel in 60 minutes.

An essentially similar solution when subjected to a tin ion dosage provided by using a tin-iron electrode and a current of 6–8 amps and 12 volts, polymerized instantly.

*Example IV*

The compositions of this invention as used in an air drilling method can best be described with reference to a specific example and the drawing. FIGURES 1 through 10, in which several distinct phases of the method are illustrated.

Referring to the drawing, FIGURE 1, the numeral 10 represents the earth's surface through which a well bore 12 is being drilled to an oil-producing formation with rotary drill pipe 14 containing a rotary bit 16 at the lower end. Pressurized air is introduced into drill pipe 14 at the surface of the earth, is conducted downwardly therein, exits through opening 15 of rotary drill bit 16 at the site or formation of drilling 18, and passes upwardly through annulus 20, surrounding drill pipe 14, carrying relatively small as well as large rock particles from the site of drilling to the earth's surface.

In FIGURE 2 rotary drill bit 16 passes through crevices 100, and penetrates a salt water formation 22 at its upper level 24 as indicated by a reduction in air circulation as well as the muddy nature of the particles recovered from the site of drilling. The depth of the drill bit is noted and thus the position of upper level 24 of salt water formation 22 is known. In FIGURE 3 drilling is continued through the salt water-bearing formation containing crevice 101, air circulation eventually ceases due to the back pressure of the salt water, a column of salt water 28 rises in the well bore and drill pipe to level 30 in annulus 20 and upper level 31 in drill pipe 14, the lower level 26 of salt water formation 22 is penetrated by rotary drill bit 16 and drilling is discontinued. Occasionally, in cases where the water formation is of considerable depth, it may not be possible to penetrate the lower level of the formation before water production stops further drilling.

A small amount, e.g., 10 gallons, of radioactive fluid, e.g., aqueous iodine 131 solution, is injected into drill pipe 14 and is shown at position 42. A detecting device 32 consisting essentially of a Geiger-counter is inserted to locate the radioactive fluid.

In FIGURE 4 gas pressure is applied to the liquid column in drill pipe 14 to move the upper level 44 of the column of radioactive liquid 42 downwardly in the drill pipe to the position shown. As the column moves downwardly salt water exits through opening 15 of rotary drill bit 16 and forms annular salt water column 48 with an upper level 50 in the annular space formed between the drill pipe and the walls of the well bore. An amount of resinous material at least sufficient to cover the portions of formation 22 exposed to well bore 12, for instance, fifty gallons of resinous material, weighted e.g. with 25% CaCl₂, to be heavier than the salt water in the well bore, consisting essentially of 20 weight percent of a mixture of 5% N,N'-methylenebisacrylamide and 95% acrylamide, and 25% CaCl₂ in water along with 0.3 weight percent of ammonium persulfate and 0.6 weight percent of nitrilotrispropionamide is injected down drill pipe 14 at a rate of 2 gallons per minute and positioned in tubular area 36 located above upper level 44 of the radioactive liquid. Detecting device 32 is used to locate the position of radioactive liquid 42. A second radioactive isotope layer 43, e.g., of iodine 131, is added on top of the resinous material.

In FIGURE 5 pressurized air is introduced downwardly in drill pipe 14 and moves the resinous material, preceded by radioactive material 42, through opening 15 and up the annulus formed between the drill pipe and the well bore walls to form an annular column of resinous material 52 (with an upper level 54) covering the portions of salt water formation 22 exposed in the well bore. In this operation the pressure of the resinous material is sufficient to force a significant quantity into the adjacent formation and the resinous material displaces annular salt water column 48 upwardly to new level 50'. As the annular resinous material column 52 is moved upwardly, radioactive material 42 is located, thus upper level 54, with device 32 which is located within drill pipe 14, to insure upward movement of upper level 54 of the resinous material at least adjacent and preferably a short distance beyond the upper level 24 of salt water formation 22. By noting the depth of the device 32 the position of upper level 54 is known. Annulus 20 is sealed at the surface with casing head 21 and air pressure up to the limit of the surface casing is used to maintain upper level 54 of annular column of resinous material 52 in the position shown. Detecting device 32 is raised (not shown) to locate layer 43 thus upper level 56 of the secondary column (tubular) of resinous material 58.

In FIGURE 6 pressurized air (250 p.s.i.) is introduced downwardly in drill pipe 14 and forces resinous material through opening 15 and causes the simultaneous injection of resinous material in area 62 into the entire portion of permeable formation 22 exposed in the well bore as shown by the indicating arrows. During this phase layer 43 thus upper lever 56 of resinous material tubular column 58 is tracked with device 32.

In FIGURE 7 the displacement of resinous material by air is discontinued when the upper level 56 of resinous material tubular column 58 is approximately even with upper level 54 of annular resinous material column 52 as determined by observing the depth of tracking device 32 and discontinuing the displacement when the device 32 reaches depth priorly noted for upper level 54. In FIGURE 8 the drill pipe and bit are lifted as shown. The well is shut in and the resinous materials maintained in this position by regulating the air pressure in both the annulus and drill pipe. However, the drill pipe can be raised above the resinous material before polymerization time and solidification of the resin as shown in FIGURE 9. Tracking device 32 is removed and iron-tin electrode system 32' (a tin ion source) is lowered (not shown) to the lowermost level of and is moved upwardly through the resin-forming material which is 13 feet in depth. Alternatively, the tin ions may be provided on the surface and introduced into the resin-forming material in the well bore using a dumping vessel in place of iron-tin electrode 32'. The resin-forming material receives a tin dosage provided by using a tin-iron electrode and a current of 6 to 8 amps and 12 volts, to set the resin immediately. In FIGURE 10, following the solidification of the resinous material, air pressure is discontinued, tin source 32' is removed, the salt water is blown out, air circulation down drill pipe 14 to rotary drill bit 16 is initiated, drilling is resumed, the solidified resinous material is drilled-through, and the drilling continues downwardly onto the earth's surface while removing cuttings from the well bore by air circulation down the drill pipe and up the well annulus.

*Example V*

The following example illustrates a method, using the liquid resin-forming materials and polymerization technique described above, to plug a permeable subterranean well area.

A specific example of our method can be illustrated by references to a field operation which is not to be considered limiting either procedurally or with respect to the compositon of the resin-forming material. In this operation the well was a water flood injection well having a 1½" diameter cement tubing and a shot bore hole. Three days were spent cleaning out the well by pumping water in and out of the bore hole using ½" pipe wash string. An injection profile was obtained by the constant interface method using fresh and salt water and the well was found to be fractured at about 814½' from ground level. The total injection rate of the well was about 1 gallon per minute of fresh water at a well head pressure of 230 p.s.i.g. Five gallons of untriggered resin-forming material, including:

| | Percent |
|---|---|
| Acrylamide | 19 |
| N,N'-methylenebisacrylamide | 1 |
| Nitrilotrispropionamide | 0.5 |
| Ammonium persulfate | 0.125 |
| Water | Balance | and with the following properties at about 75° F.:

| | Centipoises |
|---|---|
| Viscosity | 1.3 |
| Specific gravity | 1.12 | are passed down a ½" tubing which contained a conductivity profiling unit, see application Serial No. 618,583 to Stefan E. Szasz, filed October 25, 1956. The resin-forming material passes by the unit and emerges from the pipe or tubing piece extending from its lower end positioned at the interface between a lower layer of salt water and an overlying layer of fresh water which is formed at about 814½' down the well. The resin-forming material is displaced down the ½" tubing at the rate of about 1 gallon per minute and while this is being done fresh water is bled at the well head from the annulus between the ½" tubing and the 1½" cement tubing. After all of the resin-forming material is in the ½" tubing a slug of salt water is added to provide a flush. During the charging of the resin-forming material into the ½" tubing string neither salt nor fresh water is added to the well. After the resin-forming material is placed in the salt-fresh water interface, the lower end of the profiling unit tubing is lowered into the salt water layer; and brine is then pumped down this tubing at the rate of 0.5 gallon per minute while fresh water is charged to the annulus between the ½" tubing and the ½" cement tubing at the rate of 0.5 gallon per minute. By lowering and raising the profiling unit tubing, while insuring that the bottom end of its lower tubing piece remained in the salt water level, the top of the resin-forming material layer is located at 814' while the bottom is at 815'. This determination is made immediately after the resin-forming material is placed in the interface. This particular resin-forming material is of a specific gravity of about 1.12 and, is substantially non-conductive so that it could be distinguished from both the salt and fresh water layers by the use of the conductivity profiling instrument. Two minutes after the first check on the resin-forming material only about 0.1' of it could be loacted by the profiling unit and in less than 1 additional minute the material is completely displaced or moved into the adjacent formation.

Shortly after the untriggered resin-forming material had been displaced into the adjacent formation, 5 additional gallons of this material, an essentially electrically non-conductive mixture and having a specific gravity of about 1.12, is placed in the salt-fresh water interface by the procedure noted above except that the resin-forming material is flushed down the profiling unit tubing by fresh water. This composition, containing 0.5 weight percent nitrilotrispropionamide and 0.125 weight percent ammonium persulfate, has a working time of 8 to 30 minutes, i.e. time during which its viscosity is below about 15 centipoises at ambient temperature, and an initial viscosity of 8.3 centipoises at 70° F. Immediately upon the placing of the resin-forming material in the interface the profiling unit detects it at a position slightly above 814½', the location of the fracture. However, as the permeability of the well at locations other than the fracture was relatively low, the resin-forming material is displaced into the adjacent area through the fraction by continuing the fresh water and brine flows at the rate of 0.5 gallon per minute. An iron-tin electrode is lowered to the lowermost level of, and is moved upwardly through, the material which is one foot in depth and receives a tin dosage provided by using a tin-iron electrode with a current of 6 to 8 amps at 12 volts to effect polymerization of the material instantly. This results in a substantial plugging of the thief zone.

It is claimed:

1. A method for combatting the obstruction of gas circulation in drilling wells employing gas as the circulation medium wherein the obstruction results from the ingress of extraneous materials into the well bore, the step comprising introducing an aqueous solution containing a resin-forming composition consisting essentially of a mixture of (a) about 1 to 25 weight percent of a monomeric alkylidene bisacrylamide of the formula

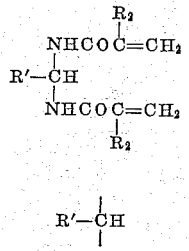

in which

is a hydrocarbon residue of an aldehyde containing from about 1 to 10 carbon atoms and $R_2$ is of the group consisting of hydrogen and methyl, and (b) about 75 to 99 weight percent of another ethylenic monomer copolymerizable with (a), (c) catalytic amounts of an oxidizing agent, and (d) a sufficient amount of $CaCl_2$ to weight the aqueous solution heavier than salt water, into a string of tubing extending downwardly in the well bore below the upper level of the formation of ingress, contacting a portion of the resinous material through the tubing to form an annular column of resinous material covering the formation of ingress in the annular space provided between the tubing and the portion of the formation of ingress exposed in the well bore, simultaneously maintaining the upper level of the annular resinous material at least to cover the formation to be sealed, while applying pressure to the resinous material remaining in the tubing to force formation sealing in the amounts of resinous material into the portion of the formation of ingress exposed in the well bore removing said tubing from contact with said resinous material, employing an electrode system for electrically discharging tin ions to subject the resinous material in this position to a tin ion dosage sufficient to solidify the resinous composition, drilling through the solidified resin, and containing drilling with gas circulation to remove cuttings from the well.

2. A method for selectively decreasing the permeability of a well area, the steps comprising locating adjacent the well bore a permeable area to be plugged which is spaced upwardly from the bottom of the well bore, providing a salt water layer in the lower portion of the well bore to the approximate location of the permeable area, positioning on said salt water layer an aqeuous solution containing organic resin-forming composition consisting essentially of a mixture of (a) about 1 to 25 weight percent of a monomeric alkylidene bisacrylamide of the formula:

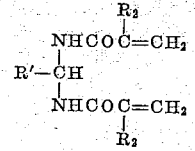

in which

is a hydrocarbon residue of an aldehyde and $R_2$ is of the group consisting of hydrogen and methyl, and (b) about 75 to 99 weight percent of another ethylenic monomer copolymerizable with (a), and (c) catalytic amounts of an oxidizing agent, said composition having a viscosity of up to about 15 centipoises, moving the resin-forming composition into the adjacent permeable area while the viscosity is up to about 15 centipoises, and employing an electrode system for electrically discharging tin ions to subject the resin-forming composition to a tin ion dosage sufficient to solidify the resinous composition and decrease the permeability of the area.

3. A method for decreasing the permeability of a permeable well area in a well bore, the steps comprising introducing an aqueous solution of resin-forming material consisting essentially of a mixture of (a) about 1 to 25 weight percent of a monomeric alkylidene bisacrylamide of the formula:

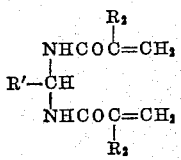

in which

is a hydrocarbon residue of an aldehyde containing from about 1 to 10 carbon atoms and $R_2$ is of the group consisting of hydrogen and methyl, and (b) about 75 to 99 weight percent of another ethylenic monomer copolymerizable with (a), and (c) catalytic amounts of an oxidizing agent, into the permeable well area and employing an electrode system for electrically discharging tin ions to contact the resin-forming material with said tin ions to obtain copolymerization to a solid material to decrease the permeability of the permeable area.

4. The method of claim 3 wherein the bisacrylamide is N,N'-methylenebisacrylamide and the ethylenic monomer is acrylamide.

5. A method for combatting the obstruction of gas circulation in drilling wells employing gas as the circulation medium wherein the obstruction results from the ingress of extraneous materials from a permeable area into the well bore, the steps comprising introducing an aqueous solution of resin-forming material consisting essentially of a mixture of (a) about 1 to 25 weight percent of a monomeric alkylidene bisacrylamide of the formula:

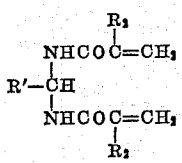

in which

is a hydrocarbon residue of an aldehyde containing from about 1 to 10 carbon atoms and $R_2$ is of the group consisting of hydrogen and methyl, and (b) about 75 to 99 weight percent of an ethylenic monomer copolymerizable with (a), and (c) catalytic amounts of an oxidizing agent, into the permeable well area and employing an electrode system for electrically discharging tin ions to contact the resin-forming material with said tin ions to obtain copolymerization to a solid material to decrease the permeability of the permeable area.

6. A method for decreasing the permeability of a permeable well area in a well bore, the steps comprising introducing an aqeuous solution of resin-forming material consisting essentially of a mixture of (a) about 1 to 25 weight percent of a monomeric alkylidene bisacrylamide of the formula

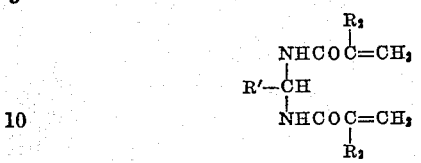

in which

is a hydrocarbon residue of a aldehyde containing from about 1 to 10 carbon atoms and $R_2$ is of the group consisting of hydrogen and methyl, and (b) about 75 to 99 weight percent of another ethylenic monomer copolymerizable with (a), and (c) catalytic amounts of a reducing agent-oxidizing agent combination into the permeable well area employing an electrode system for electrically discharging tin ions to contact the resin-forming material with said tin ions to obtain copolymerization to a solid material to decrease the permeability of the permeable area.

7. The method of claim 6 wherein the reducing agent is nitrilotrispropionamide and the oxiding agent is ammonium persulfate.

8. The method of claim 7 wherein the reducing agent-oxidizing agent combination in present in amounts of about 0.01 to 2.0 weight percent based on said resin-forming material.

9. The method of claim 6 wherein the bisacrylamide is N,N'-methylenebisacrylamide and the ethylenic monomer is acrylamide.

10. The method of claim 5 wherein the oxidizing agent is provided with promotional amounts of a reducing agent.

11. The method of claim 10 wherein the oxidizing agent and reducing agent are each present in amounts of about 0.1 to 2 weight percent of said resin-forming material.

References Cited in the file of this patent

UNITED STATES PATENTS

| | | |
|---|---|---|
| 2,475,846 | Lundberg | July 12, 1949 |
| 2,680,110 | Loughran et al. | June 1, 1954 |
| 2,727,015 | Auten et al. | Dec. 13, 1955 |
| 2,801,984 | Morgan et al. | Aug. 6, 1957 |
| 2,856,380 | Roth | Oct. 14, 1958 |
| 2,867,278 | Mallory et al. | Jan. 6, 1959 |
| 2,869,642 | McKay et al. | Jan. 20, 1959 |
| 2,889,883 | Santora | June 9, 1959 |
| 2,940,729 | Rakowitz | June 14, 1960 |
| 3,044,548 | Perry | July 17, 1962 |